US007232865B2

(12) United States Patent
DeRudder et al.

(10) Patent No.: US 7,232,865 B2
(45) Date of Patent: Jun. 19, 2007

(54) TRANSPARENT AND HIGH-HEAT POLYCARBONATE-POLYSILOXANE COPOLYMERS AND TRANSPARENT BLENDS WITH POLYCARBONATE AND A PROCESS FOR PREPARING SAME

(75) Inventors: James Louis DeRudder, Mt. Vernon, IN (US); Niles Richard Rosenquist, Evansville, IN (US); Gary Charles Davis, Albany, NY (US); Matthew Robert Pixton, Mt. Vernon, IN (US); Mark Erik Nelson, Mt. Vernon, IN (US); Zhaohui Su, Changchun Jilin (CN)

(73) Assignee: General Electric Company, Schenectady, NY (US)

( * ) Notice: Subject to any disclaimer, the term of this patent is extended or adjusted under 35 U.S.C. 154(b) by 360 days.

(21) Appl. No.: 10/797,418

(22) Filed: Mar. 10, 2004

(65) Prior Publication Data

US 2004/0220330 A1     Nov. 4, 2004

Related U.S. Application Data

(60) Provisional application No. 60/454,030, filed on Mar. 11, 2003.

(51) Int. Cl.
*C08F 20/00*     (2006.01)

(52) U.S. Cl. .................. 525/446; 528/196; 528/198; 528/271; 528/272; 556/418; 556/437; 558/281

(58) Field of Classification Search ............. 528/196, 528/198, 271, 272; 556/418, 437; 558/281; 525/446
See application file for complete search history.

(56) References Cited

U.S. PATENT DOCUMENTS

| 3,640,943 | A | 2/1972 | Bostick et al. |
| 3,686,355 | A | 8/1972 | Gaines et al. |
| 4,126,740 | A | 11/1978 | Factor et al. |
| 4,147,707 | A | 4/1979 | Alewelt et al. |
| 4,207,264 | A | 6/1980 | Anderson et al. |
| 4,224,215 | A | 9/1980 | Macke |
| 4,569,970 | A | 2/1986 | Paul et al. |
| 4,584,360 | A | 4/1986 | Paul et al. |
| 4,612,238 | A | 9/1986 | DellaVecchia et al. |
| 4,657,989 | A | 4/1987 | Evans |
| 4,681,922 | A | 7/1987 | Schmidt et al. |
| 4,732,949 | A | 3/1988 | Paul et al. |
| 4,746,701 | A | 5/1988 | Kress et al. |
| 4,777,212 | A | 10/1988 | Kress et al. |
| 4,782,115 | A | 11/1988 | Paul et al. |
| 4,794,141 | A | 12/1988 | Paul et al. |
| 4,861,829 | A | 8/1989 | Kress et al. |
| 4,912,165 | A | 3/1990 | Winfried et al. |
| 4,925,891 | A | 5/1990 | Kress et al. |
| 5,032,661 | A | 7/1991 | Serini et al. |
| 5,100,960 | A | 3/1992 | Grigo et al. |
| 5,109,076 | A | 4/1992 | Freitag et al. |
| 5,112,925 | A | 5/1992 | Horlacher et al. |
| 5,137,949 | A | 8/1992 | Paul et al. |
| 5,214,183 | A | 5/1993 | Fyvie et al. |
| 5,322,882 | A | 6/1994 | Okamoto |
| 5,344,908 | A | 9/1994 | Rosenquist |
| 5,380,795 | A | 1/1995 | Gosens et al. |
| 5,416,185 | A | 5/1995 | Becraft et al. |
| 5,451,632 | A | 9/1995 | Okumura et al. |
| 5,455,310 | A | 10/1995 | Hoover et al. |
| 5,480,959 | A | 1/1996 | Schmidhauser |
| 5,508,375 | A | 4/1996 | Hucks et al. |
| 5,530,083 | A | 6/1996 | Phelps et al. |
| 5,608,027 | A | 3/1997 | Crosby et al. |
| 5,616,674 | A | 4/1997 | Michel et al. |
| 5,783,651 | A | 7/1998 | König et al. |
| 6,001,929 | A | 12/1999 | Nodera et al. |
| 6,072,011 | A | 6/2000 | Hoover |
| 6,323,280 | B1 | 11/2001 | Paul et al. |
| 6,492,481 | B1 | 12/2002 | Davis et al. |

FOREIGN PATENT DOCUMENTS

| EP | 0206006 A1 | 12/1986 |
| EP | 0236837 A2 | 9/1987 |
| EP | 0239764 A2 | 10/1987 |
| EP | 0247430 B1 | 12/1987 |
| EP | 0258728 A3 | 3/1988 |
| EP | 0322690 A1 | 7/1989 |
| EP | 0374508 A2 | 6/1990 |
| EP | 0376052 B1 | 7/1990 |
| EP | 0522751 B1 | 1/1993 |
| EP | 0522753 A2 | 1/1993 |
| EP | 0524731 B1 | 1/1993 |
| EP | 0425894 B1 | 4/1994 |
| EP | 0595141 A1 | 5/1994 |
| EP | 0600196 B1 | 6/1994 |
| EP | 0644220 | 3/1995 |
| EP | 0764676 | * 9/1997 |

(Continued)

OTHER PUBLICATIONS

PCT Search Report for International Application No. PCT/US2004/005215, International Filing Date Feb. 23, 2004.

(Continued)

*Primary Examiner*—Terressa Boykin
(74) *Attorney, Agent, or Firm*—Marina Larson & Associates, LLC

(57) ABSTRACT

A method is provided for making siloxane polycarbonate copolymers and blends of other polycarbonates with such copolymers wherein the copolymers and blends have excellent transparency and physical characteristic.

98 Claims, 4 Drawing Sheets

FOREIGN PATENT DOCUMENTS

| | | |
|---|---|---|
| EP | 0864599 A2 | 9/1998 |
| JP | 62-088134 | 4/1987 |
| JP | 5-202182 | 8/1993 |
| JP | 1993311075 A | 11/1993 |
| JP | 6008386 B | 2/1994 |
| JP | 1994240148 A | 8/1994 |
| JP | 1995173276 A | 7/1995 |
| JP | 1995207140 A | 8/1995 |
| JP | 1995224219 A | 8/1995 |
| JP | 1997235376 A | 9/1997 |
| JP | 1999045139 A | 2/1999 |
| JP | 3151789 | 4/2001 |
| JP | 3180406 B2 | 6/2001 |
| JP | 3180407 | 6/2001 |
| WO | WO 80/00084 | 1/1980 |

OTHER PUBLICATIONS

"Surface Composition of Siloxane-Containing Polymers". Authors: Gorelova, Marianna; Levin, Victor. Makromol. Chem., Macromol Symp. 44, 317-326 (1991).

"Preferential Enrichment of Chemistry at Polymer Surfaces". Authors: Lopez, Leonardo C.; Dwight, David W.; Journal of Applied Polymer Science, vol. 36, 1401-1415 (1988).

"Study of Surface Composition and Morphology of Block Copolymers of Bisphenol A Polycarbonate and Poly(dimethylsiloxane) by X-ray Photoelectron Spectroscopy and Ion Scattering Spectroscopy", Authors: Schmitt, Robert L., Gardella, Joseph A. Jr., Magill, Joseph H., Salvati, Lawrence Jr., Chin, Roland L., Macromolecules 1985, vol. 18, No. 12, 2675-2679.

"On the Surface Morphology of Block Copolymers". Author: Gaines, George L., Jr., Macromolecules 1981, vol. 14, 208.

"Esca Analysis of Polyphosphazene and Poly(siloxane/Carbonate) Surfaces". Authors: Dwight, D.W., McGrath, J.E., Beck, A.R., and Riffle, J.S.; Virginia Polytechnic Institute and State University, Blacksburg, Virginia, Source: 20, No. 1, Apr. 1979, p. 702-705.

"Surface Behavior of Binary Polymeric Systems". Gorelova, M.M., Pertsin, A.I., Makarova, L.I., Filimonova, L.V., Levin, V. Yu. Polymer Science USSR, vol. 34, No. 2, 145-150 (1992).

* cited by examiner

Figure 1. Haze formation, Five different Production Lots of PC siloxane co-polym

| Lot | A | B | C | D | E |
|---|---|---|---|---|---|
| % siloxane | 6 | 6 | 5.1 | 4.9 | 4.8 |
| MW | 22814 | 23028 | 22843 | 22371 | 22674 |
| Haze, 620 F, std. | 2.3 | 2.8 | 1.5 | 1.4 | 1.4 |
| Haze, 620 F, 5 min dwell | 14 | 24.9 | 2.4 | 3.1 | 4.1 |
| Haze, 620 F, 10 min dwell | 36 | 68.3 | 4.3 | 11.6, 3.0 | 13.5 |

Figure 2: The effect of Various Phosphorus-based Acids on Haze Formation in PC siloxane Co-polymer on Abusive Molding
(All phosphorus acids evaluated at equivalent molar levels).

| | Comp Ex 1 | Ex. 1 | Ex. 2 | Ex. 3 | Ex. 4 | Ex. 5 | Ex. 6 |
|---|---|---|---|---|---|---|---|
| PC siloxane, lot A | 100% | 100% | 100% | 100% | 100% | 100% | 100% |
| H3PO3 | | 0.9 ppm | 2.25 ppm | | | | |
| H3PO4 | | | | 1.08 ppm | 2.74 ppm | | |
| MZP(monozinc phosphate) | | | | | | 3.24 ppm | 8.1 ppm |
| 620 F, std cycle % haze | 4.4 | 2.3 | 1.8 | 1.6 | 1.3 | 1.4 | 1.5 |
| 620 F, 10 min dwell, % haze | 76.1 | 23.3 | 1.9 | 1.1 | 1.4 | 1.4 | 3.9 |
| MVR, 18 min Dwell | 11.17 | 9.21 | 8.74 | 8.46 | 8.50 | 8.38 | 7.91 |
| MVR, 6 min Dwell | 10.26 | 9.01 | 8.47 | 8.01 | 7.95 | 8.08 | 7.72 |
| 300 C, viscosity, P | 5516.0 | 5990.0 | 6168.0 | 6316.0 | 6425.0 | 6404.0 | 6626.0 |
| % Change, 30 min, 300 C | -14.0 | -13.0 | -12.0 | -13.0 | -12.0 | -10.0 | -8.5 |
| 620 F, std cycle % haze | 4.4 | 2.3 | 1.8 | 1.6 | 1.3 | 1.4 | 1.5 |
| % haze, autoclave, 24 hrs | 8.3 | 6.1 | 5.1 | 4.2 | 4.5 | 5.6 | 5.4 |
| 48 hrs | 12.4 | 9.9 | 8.5 | 7 | 8.2 | 10.3 | 12.8 |
| 72 hrs | 13.4 | 11.6 | 10.1 | 8.7 | 11.7 | 13.4 | 15.5 |
| 120 hrs | 16.5 | 14.8 | 16.1 | 16.3 | 22.1 | 25.9 | 20.6 |
| 144 hrs | 18.9 | 20.3 | 22 | 22.2 | 29.3 | 34.1 | 21.9 |
| 168 hrs | 24.6 | 22.6 | 23.7 | 23.8 | 31.7 | 36.7 | 40.6 |
| 192 hrs | 25.9 | 23.5 | 25.2 | 23.4 | 31.2 | 36.4 | 42.2 |
| 216 hrs | 28.6 | 26.1 | 28.5 | 26.7 | 36.3 | 40.6 | 48.2 |
| 240 hrs | 30.1 | 27.6 | 30.8 | 29.1 | 38.8 | 43.9 | 53.5 |
| MW, 240 hrs | 20717 | 20925 | 20759 | 20863 | 20500 | 20717 | 20722 |

(initial MW,Comp. Ex. 1, 22308)

Figure 3. Repeat Testing of H3PO3 in a Different lot of PC-siloxane Resin:
Testing the Effect of H3PO3 of a lot of Resin that Exhibits Relatively Low Haze on Abusive Molding

| Lot E | Comp. Ex.2 | | Ex 7 | | Ex 8 | | Comp.Ex 3 | |
|---|---|---|---|---|---|---|---|---|
| H3PO3 | 0.00 | 100% | 0.9 ppm | 100% | 2.25 ppm | 100% | 0.0 | 100% |
| butyl tosylate | 0.00 | | | | | | 0.0 | |
| | | | | | | | | |
| MVR, 18 min Dwell | 10.16 | | 9.43 | | 9.06 | | 9.56 | |
| MVR, 6 min Dwell | 8.94 | | 8.97 | | 8.85 | | 9.00 | |
| | | | | | | | | |
| 620 F, std cycle | | 1.4 | | 1.2 | | 1.0 | | 1.2 |
| 620 F, 5 min dwell | | 2.1 | | 1.0 | | 1.0 | | 3.3 |
| 620 F, 10 min dwell | | 7.0 | | 1.0 | | 0.6 | | 12.9 |
| | | | | | | | | |
| 620 F, std cycle | | 1.3 | | 1 | | 1 | | 1.2 |
| 24 hrs | | 2.1 | | 1.8 | | 2 | | 2.1 |
| 48 hrs | | 2.6 | | 2.6 | | 2.8 | | 3.1 |
| 72 hrs | | 2.6 | | 4.2 | | 3.6 | | 4.5 |
| 96 hrs | | 3.5 | | 4.4 | | 7.3 | | 8 |
| 120 hrs | | 3.9 | | 4.8 | | 8.1 | | 7.8 |
| 144 hrs | | 3.9 | | 5.4 | | 8.4 | | 9.5 |
| 168 hrs | | 4.9 | | 6.3 | | 9 | | 12.4 |

Figure 4: Multilot Testing of H3PO3 in Five Different Lots of PC-siloxane Resin to Demonstrate the Generality of the Stabilization Effect

| | Comp Ex. 4 | Ex. 9 | Ex. 10 | Comp Ex. 5 | Ex. 11 | Ex.12 | Comp Ex. 6 | Ex.13 | Ex. 14 | Comp Ex. 7 | Ex.15 | Ex. 16 | Comp Ex. 8 | Ex. 17 | Ex. 18 |
|---|---|---|---|---|---|---|---|---|---|---|---|---|---|---|---|
| Lot F | 100% | 100% | 100% | | | | | | | | | | | | |
| Lot G | | | | 100% | 100% | 100% | | | | | | | | | |
| Lot H | | | | | | | 100% | 100% | 100% | | | | | | |
| Lot I | | | | | | | | | | 100% | 100% | 100% | | | |
| Lot J | | | | | | | | | | | | | 100% | 100% | 100% |
| H3PO3 | 0.00 | 0.9 ppm | 2.25 ppm | 0.00 | 0.9 ppm | 2.25 ppm | 0.00 | 0.9 ppm | 2.25 ppm | 0.00 | 0.9 ppm | 2.25 ppm | 0.00 | 0.9 ppm | 2.25 ppm |
| % siloxane | 4.7% | | | 5.2% | | | 4.9% | | | 5.0% | | | 4.9% | | |
| MW | 18,563 | | | 20,445 | | | 20,877 | | | 25,062 | | | 23,427 | | |
| %Haze, 620 F, std cycle | 2.1, 2.2 | 1.8, 1.9 | 1.5, 2 | 2.2 | 2 | 2.4 | 2.2 | 1.9 | 1.6 | 1.6 | 1.3 | 1.1 | 1.4 | 1.5 | 1.4 |
| %Haze, 620 F, 5 min dwell | 2.4, 5.1 | 2.5, 2.8 | 1.9, 2.6 | 3.2 | 2.4 | 2.5 | 3.2 | 2.1 | 1.7 | 1.9 | 1.4 | 1.2 | 1.7 | 2.1 | 1.6 |
| %Haze, 620 F, 10 min dwell | 26.6, 29.1 | 7.2, 10.8 | 3.3, 7.3 | 10.7 | 3 | 2.6 | 14.1 | 2.8 | 1.8 | 3.4 | 1.7 | 1.3 | 4.7 | 2.7 | 1.8 |

Lot F was tested in duplicate in separate experiments.

TRANSPARENT AND HIGH-HEAT POLYCARBONATE-POLYSILOXANE COPOLYMERS AND TRANSPARENT BLENDS WITH POLYCARBONATE AND A PROCESS FOR PREPARING SAME

This application claims rights of priority from U.S. Provisional Patent Application Ser. No. 60/454,030, filed Mar. 11, 2003, which is hereby incorporated by reference.

BACKGROUND OF THE INVENTION

This application relates to polycarbonate-polysiloxane copolymers and polycarbonate-polysiloxane/polycarbonate blends having good transparency and good heat resistance and the process for preparing the same.

Polycarbonate is a type of plastic that is used for many applications that require both strength and clarity (e.g., eyeglass lenses, windows, etc.). The most widely produced polycarbonate is a homopolymer made by polymerizing Bisphenol A ("BPA"). Unfortunately, for some applications, such as automotive lighting lenses and films used in optical displays, the glass transition temperature (Tg) (150° C.) of BPA homopolymer is too low to prevent the part from softening or melting under typical use conditions. It is known in the art that the heat resistance of BPA polycarbonate can be improved through incorporation of a high heat co-monomer, such as menthane bisphenol (BHPM), into the BPA polycarbonate polymer chains. Copolymers of BHPM, such as 4,4'-[1-methyl-4-(1-methyl-ethyl)-1,3-cyclohexandiyl]-bisphenol (1,3-bis-hydroxyphenyl menthane, hereinafter referred to as 1,3-BHPM) and 2,8-di-(4-hydroxyphenyl)menthane (referred to as 2,8-BHPM), and BPA are described in U.S. Pat. No. 5,480,959 to GE (Schmidhauser). Unfortunately, while these materials have a high Tg, they suffer from minimal ductile impact (i.e., inferior toughness), even at room temperature. Thus, a transparent polycarbonate-polysiloxane copolymer with a Tg above 150° C. and good impact properties would be a desirable material.

Polycarbonate-polysiloxane copolycarbonates of bisphenol A (BPA) and siloxane comonomers are known to have excellent impact resistance properties in comparison with BPA homopolycarbonates, especially at lower temperatures. Such materials have found commercial use in articles such as helmets and automobile parts, and many other applications requiring impact resistance. Also, BPA/siloxane copolymers have enhanced flame-retardant properties in comparison with BPA polycarbonate, and have been successfully been used to replace halogenated flame retardant products for some applications requiring this performance.

Unfortunately, BPA/siloxane copolymers have proven difficult to manufacture at commercial scale because while BPA homopolycarbonate may be used in applications requiring clarity (e.g., eyeglass lenses and optical disks) it has proven difficult to make clear (i.e., high % transmission and low haze) BPA/siloxane copolymers. Also, the difficulty in making a transparent copolycarbonate adversely affects manufacturing change-over between products because large amounts of "off specification" products are made when changing back and forth between making clear BPA homopolycarbonate and unclear BPA/siloxane copolymers.

A previous attempt to make transparent BPA/siloxane copolymers is described by Phelps and coworkers in U.S. Pat. No. 5,530,083 ("'083"). In '083, Phelps et al. disclose a process ("Phelps method") which comprises adding phosgene to a bisphenol under interfacial reaction conditions and at a pH1 in the range of from about 10 to about 12 in the presence of an effective amount of phase transfer catalyst. After about 1 to about 99 mole percent of phosgene was added (based on the total moles of available hydroxyl groups of the bisphenol), the pH was lowered to a value in the range of about 8 to about 9 (pH is a logrhythmic scale so the acid concentration decreases by a factor of 10× going from 10 to 9). Phosgene addition was continued, while maintaining the pH range until there was present at least a sufficient amount, and up to 5% mole % excess of phosgene which is adequate to generate enough chloroformate end groups capable of reacting with available biphenol hydroxyl groups and any hydroxyaryl groups present in the terminal position of polydiorganosiloxane weight percent requirements in the resulting siloxane polycarbonate block copolymer. Next, the predetermined weight percent of the hydroxyaryl polydiorganosiloxane was added, and the pH of the resulting mixture was raised to a value of about 10 to about 12. Finally, excess chloroformate groups were removed (e.g., by adding triethyl amine and/or a chainstopper).

The Phelps method produced a more random copolymer since no phosgene and few short BPA oligomers were present to react and form carbonates with neighboring siloxane oligomers. In prior methods, the BPA had been present simultaneously with the phosgene and siloxane, leading to formation of two separate block copolymers due to reactivity differences between the BPA and the siloxane. It was believed that reactions carried out by the Phelps method circumvented the differences in reactivity between the hydroxyaryl polydiorganosiloxane and BPA. These reaction mixtures were characterized by a single homogenous organic phase. The Phelps method produced a more random distribution of the siloxane and resulted in a more transparent product. These materials were further characterized after extrusion either as homopolymers or as blends with BPA homopolycarbonate. Such copolymers prepared with 5 wt % final siloxane concentration resulted in a haze of 6.9, while a siloxane copolymer made by this method and blended with polycarbonate to produce a 5 wt % siloxane composition had a haze of 27.8. While this represented a significant improvement over pre-existing commercial processes which produced haze values of greater than 60 for both copolyers and blends, more work was necessary to make a clear, commercially-viable product.

It would also be desirable to make a low haze, high impact, heat resistant product because for some applications, such as automotive lighting lenses and films used in optical displays, the glass transition temperature (Tg) (150° C.) of BPA homopolymer is inadequate. It is known in the art that the heat resistance of BPA polycarbonate can be improved through incorporation of a high heat monomer, such as menthane bisphenol (BHPM), into the BPA polycarbonate polymer chains. Copolymers of BHPM, such as 4,4'-[1-methyl-4-(1-methyl-ethyl)-1,3-cyclohexandiyl]-bisphenol (1,3-bis-hydroxyphenyl menthane, hereinafter referred to as 1,3-BHPM) and 2,8-di-(4-hydroxyphenyl)menthane (referred to as 2,8-BHPM), and BPA are described in U.S. Pat. No. 5,480,959 to GE (Schmidhauser). Unfortunately, these materials suffer from minimal ductile impact, even at room temperature. A transparent polycarbonate copolymer with a Tg above 150° C. and good impact properties would be ideal.

SUMMARY OF THE INVENTION

The present invention is based at least in part on the discovery that in order to produce a highly clear copolymer, the bischloroformate must be produced at much lower pH (e.g., 3-8) than was used in the process of Phelps. Without wishing to be bound by any theory, Applicants believe that the process of Phelps only produced a relatively small excess of bischloroformate groups available to react with a hydroxyaryl-terminated polydiorganosiloxane, (i.e., probably less than 4x and this was not sufficient to create a truly clear copolymer). A molar excess of at least 4x for mole % chloroformate endgroups to mole % phenolic endgroups (calculated based on the polydiorganosiloxane only) is thought to be required, with 10x, 30x and 50x representing other typical values. Applicants believe that preparing the bischloroformate at a lower pH (e.g., 3-8), without allowing substantial oligomerization at a pH of 10 to 12 prior to lowering the pH for chloroformate production as in the Phelps method, produced shorter oligomers and created a greater relative concentration of bischloroformates that enabled the production of a clear polycarbonate-polysiloxane copolymer. Applicants further found that the reaction time between the bischloroformates and the hydroxyaryl-terminated polydiorganosiloxane typically needed to be kept relatively long to improve clarity, preferably 10-20 minutes.

In one facet of the invention, there is provided a method for preparing an aromatic bischloroformate mixture. The method comprises combining one or more aromatic dihydroxy compounds, phosgene, a phase transfer catalyst, an aqueous solvent and an organic solvent under typical reaction conditions for making polycarbonates via the interfacial reaction method while maintaining the pH in a range of about 3 to about 8, preferably about 6 to about 7.

In this method co-phosgenation catalysts such as trialyl amines are avoided, except as an undesirable impurity and the pH is adjusted typically via addition of aqueous NaOH. The phase transfer catalyst should be present in an amount effective to catalyze the reaction between phosgene and the aromatic dihydroxy compound(s) until about 105 to 150 mole percent of phosgene has been added based on the total moles of available hydroxyl groups of the one or more aromatic dihydroxy compounds.

In another facet of the invention, there is provided a method for making a polycarbonate-polysiloxane copolymer. The polycarbonate-polysiloxane copolymer comprises from about 0.5% to about 80% by weight of a hydroxyaryl-terminated polydiorganosiloxane. The method comprises the steps of:

(A) preparing a bischloroformate reaction mixture by combining a first portion of one or more aromatic dihydroxy compounds with phosgene, a phase transfer catalyst, an aqueous solvent and an organic solvent under interfacial reaction conditions while maintaining the pH in the range of from about 3 to about 8;

(B) adding a portion or all of the hydroxyaryl-terminated polydiorganosiloxane to the resulting mixture of (A), wherein the total hydroxyaryl-terminated polydioranosiloxane is a sufficient amount to satisfy the desired polydiorganosiloxane weight percent requirements in the finally resulting polycarbonate-polysiloxane copolymer;

(C) adjusting the pH of the mixture forward in step (B) to a value in the range of about 10 to about 14 either before, during or after step (B);

(D) subsequently adding one or more of the remaining portions of the total amount of the one or more aromatic dihydroxy compounds, an aqueous solvent and an organic solvent;

(E) optionally repeating the addition of hydroxyaryl-terminated polydiorganosiloxane and/or aromatic dihydroxy compound until the total amount of the one or more aromatic dihydroxy compounds has been added and all of the hydroxyaryl-terminated polydiorganosiloxane has been added;

(F) allowing reaction to occur until 50 ppm or less of residual chloroformates remain;

(G) subsequently adding an agent selected from the group consisting of a chainstopper, a co-phosgenation catalyst and combination thereof, to the resulting mixture of (F); and (H) adding a sufficient amount of phosgene to the resulting mixture of (G), while maintaining a pH of about 9 to about 12, to complete a reaction to form the polycarbonate-polysiloxane copolymer.

Another facet of the invention is copolymers prepared by the above method and blends of such copolymers with other polymers such as BPA homopolycarbonate.

Another facet of the invention is a polycarbonate-polysiloxane copolymer comprising Bishpenol A sub units and polydiorganosiloxane sub units wherein less than 0.5 mole % of the polydiorganosiloxane sub units are directly coupled to another polydiorganosiloxane sub units. Also, blends of such copolymers with other resins are included.

Another facet of the invention is shaped articles comprising the polycarbonate-polysiloxane copolymers and blends disclosed herein.

Another aspect of the invention is a method for making a polycarbonate-polysiloxane copolymer, which method comprises steps of:

a) reacting a mixture comprising an aromatic dihydroxy compound, water, an organic solvent and phosgene in the presence of a phase transfer catalyst and the absence of a co-phosgenation catalyst while adding sufficient quantities of base to maintain the pH between 3 and 8 to form bischloroformate oligomer mixture;

b) adding to the bischloroformate oligomer mixture a hydroxyaryl-terminated polydiorganosiloxane and adjusting the pH (before or after said addition) by base addition to a range of from 10 to 14;

c) adding a second quantity of a dihydroxy compound;

d) allowing the polymerization reaction to proceed for a time sufficient to reduce the chloroformate level to less than 50 ppm but for a time insufficient to cause substantial hydrolysis of the polymer;

e) adding a chainstopper and a tertiary amine; and f) adding phosgene to complete the reaction and adjusting the pH to 9-11.

In yet another facet of the invention, there is provided a method for making a transparent polycarbonate-polysiloxane copolymer by reacting, in the presence of a phase transfer catalyst and a pH of from 3-8, an amount of chloroformate oligomers formed from aromatic dihydroxy compounds together with am amount of hydroxaryl-terminated polydiorganosiloxanes. In this method, the ratio of mole % of chloroformate groups to mole % of phenolic endgroups from the polydiorganosiloxane is preferably at least 4x, more preferably at least 10x.

BRIEF SUMMARY OF FIGURES

FIG. 1 is a table depicting haze measurements of molded polycarbonate-polysiloxane test parts under standard and abusive molding conditions.

FIG. 2 is a table depicting haze measurements of molded polycarbonate-polysiloxane test parts under standard and abusive molding conditions, wherein the formulations comprise phosphorous acid stabilizers.

FIG. 3 is a table depicting further data similar to FIG. 2.

FIG. 4 is a table depicting further multilot data similar to FIGS. 2 and 3.

DETAILED DESCRIPTION OF THE INVENTION

Many attempts have been made to prepare a truly clear polycarbonate-siloxane copolymer, either as a 5 wt % siloxane copolymer or as a blend of a siloxane copolymer with polycarbonate homopolymer to yield a blend containing up to about 15 wt % siloxane. A variety of experiments were carried out looking at potential variants on the historical procedures. Unfortunately, all of the attempts to achieve clarity by these methods failed.

In a new process described herein, the bischlorformate oligomers are formed in the presence of a phase transfer catalyst (PTC) at a pH of about 3 to about 8, more preferably 6-7 (optimum pH depends on equipment and the exact copolymer used—best conditions for transparency may be determined by trial and error). Without wishing the invention to be limited by any theory, it is suspected that Applicants' process results in a significantly higher concentration of bischloroformate species for the siloxane to react with. By preparing the oligomers at relatively low pH, it is thought that the concentration of chloroformate end groups was increased to greater than a 30 fold excess over the eugenol siloxane endgroups versus the less smaller excess typical of the prior art. In addition, it is thought that additional reaction time is beneficial for the process. However, the reaction time should be short enough such that undesirable hydrolysis is avoided.

As used herein with respect to the invention, the term "haze" is used to describe the level of translucence and means that percentage of transmitted light which in passing through the specimen deviates from the incident beam by forward scattering (ASTM D 1003-61). As used hereinafter, transparency is defined as low haze, which means a haze value of 10% or less.

As used herein with respect to the invention, the % transmission means the ratio of transmitted light to incident light in accordance with Method E 308 (ASTM D 1003-61).

As used herein with respect to the invention, "clear" is used to refer to a low haze, high % transmission material.

As used herein with respect to the invention, the term "glass transition temperature" (abbreviated as Tg) means the approximate temperature at which increased molecular mobility results in significant changes in properties of a cured resin between a viscous or rubbery condition and a hard, relatively brittle one. The measured value of Tg can vary, depending upon the test method.

As used with respect to the invention, "BPI" is herein defined as 1,1-bis-(4-hydroxyphenyl)-3,3,5-trimethylcyclohexane. "Polycarbonate-polysiloxane copolymer" refers to a copolycarbonate containing both carbonate and silicone structural units. "Wt % Si" (Weight percent siloxane) denotes the weight of diorganosiloxy units in a given polycarbonate-polysiloxane copolymer relative to the total weight of the polycarbonate-polysiloxane copolymer. It is obtained by multiplying the weight in grams of the siloxane used times the weight fraction of diorganosiloxy units in the aromatic dihydroxy compounds and dividing the product by the total weight in grams of all of the aromatic dihydroxy compounds used in the preparation of the polycarbonate-polysiloxane copolymer.

One version of this new method for making polycarbonate-polysiloxane copolymers is as follows. A reactor was charged with a portion of an aromatic dihydroxy compound (such as BPA), water, and an organic solvent (such as a chlorinated aliphatic organic liquid, such as methylene chloride) and was phosgenated in the presence of a PTC (such as a methyltributylammonium salt) at a pH of 3-8, preferably 6-7, to form bischloroformate oligomers. At this stage it was found to be important not to add co-catalysts such as trialkyl amines although in production small quantities may be present as an impurity. To this mixture was added a hydroxyaryl-terminated polydiorganosiloxane (such as eugenol-capped siloxane, 2-allylphenol capped siloxane, isopropenylphenol capped siloxane, or 4-hyroxystyrene capped siloxane), which was allowed to react at a pH of 10-14, preferably 10.5, for a period of time ranging from 5-60 minutes, preferably 10 to 30 minutes. It is somewhat preferred to add the polydiorganosiloxane before raising the pH, but the pH should be achieved relatively quickly (approximately a minute or two). It is also possible to raise the pH during or after addition of the polydiorganosiloxane. The remaining BPA was then added, and the disappearance of chloroformates was monitored by phosgene paper. When less than 50 ppm, preferably less than 1 ppm, of chloroformates remain, the chainstopper and a co-phosgenating catalyst, such as a trialkylamine, were added and the reaction phosgenated to completion at a pH of 9-12, preferably 9.5-11.5, more preferably 10-11. The time of reaction will depend upon the equipment used and the rate of phosgene addition, etc. If the reaction is allowed to progress too long, to the point where chloroformates disappear altogether, hydrolysis of the polymer will begin, and this should be avoided as it will result in a decreased molecular weight. The optimal time for maximum molecular weight build short of hydrolysis may be determined by trial and error. Simply varying the time versus molecular weight. Next the resulting resin was purified. For example, the resin was centrifuged to remove the brine phase, followed by two acid washes, 4 water washes and a final water strip. The chloride-free resin was then steam-precipitated and dried.

Extrusion of the 5 wt % (total siloxane content) copolymer resulted in haze as low as 4.1. Blends of higher wt % siloxane copolycarbonates with BPA polycarbonate resulted in even better transparency, with a haze of around 2% compared to 27.8% reported by '083 Phelps, et al. Blends of even higher wt % even up to 80% siloxane copolycarbonates also resulted in good clarity. This is extremely important because it will allow the formulation of transparent products currently not possible and at the same time reduce the "off-specification flush" material produced in the plant between runs of polycarbonate homopolymer and polycarbonate-polyordiorganosiloxane-copolymer.

It was also found that the same procedure could be employed to produce impact-modified transparent materials having good heat resistance by including a high heat monomer (meaning an aromatic dihydroxy compound that upon polymerization produces a polymer with a higher Tg than BPA at equivalent molecular weight) for all or part of the aromatic dihydroxy compound. Copolymers of BHPM and polydiorganosiloxane made by the above method can have Tg greater than 200° C., can be completely transparent as copolymers, and can form transparent blends with BHPM homopolymer. It is anticipated other polymers can be used to form transparent blends with these copolymers as well. A general description of this method is as follows. A reactor is charged with a portion of the total high heat monomer and is phosgenated in the presence of a PTC at pH of 3-8, preferably 6-7 to form bischloroformate oligomers. To this was added the eugenol-capped siloxane charge, and this is allowed to react at pH 10.5 for a period of time from 10 to 30 minutes. The remaining portion of high heat monomer is then added and the disappearance of chloroformates was monitored by phosgene paper. When all the chloroformates completely disappear, the chainstopper and TEA are added, and the reaction is phosgenated to completion typically at pH 10-11. The resulting resin is then purified by centrifuging to remove the brine phase followed by two acid washes, 4 water washes and a final water strip. The chloride free resin is then steam precipitated and dried.

Hydroxyaryl-terminated polydiorganosiloxanes may be prepared in the manner described in U.S. Pat. No. 5,530,083. Some non-limiting examples of the aliphatically unsaturated monohydric phenols which can be used to make the hydroxyaryl-terminated polydiorganosiloxanes are: 2-methoxy-4-alkylphenol (also known as eugenol), 2-allylphenol 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propargylphenol, 2-allyl-4,6-dimethylphenol, 2-allyl-4-bromo-6-methylphenol, 2-allyl-6-methoxy-4-methylphenol and 2-allyl-4,6-dimethylphenol.

Some non-limiting examples of the hydroxyaryl-terminated polydiorganosiloxanes used in this invention are phenol-siloxanes included within the formula:

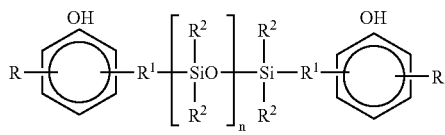

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-3)}$ monovalent organic radicals, and n is an integer greater than or equal to 1, preferably greater than or equal to 6, more prefereably 10, more preferably greater than or equal to 25, and most preferably greater than or equal to 40. It is also preferred to have n be an integer less than or equal to 1000, preferably less than or equal to 100, more preferably less than or equal to 75, and most preferably less than or equal to 60. In one embodiment n is less than or equal to 50. In another embodiment, n is an integer from 30 to 60. As used hereinafter, diorganosiloxy units are defined as the portion —[$R^2$—SiO—$R^2$]— of the formula shown above. Preferred hydroxyaryl-terminated polydiorganosiloxanes are those where $R^2$ is methyl and R is hydrogen or methoxy and is located in the ortho position to the phenolic substituent and $R^1$ is propyl and is located ortho or para to the phenolic substituent.

Typical chainstoppers may be used, such as p-cumylphenol. Some non-limiting examples of chainstoppers include phenol, p-tert-butylphenol, p-cumylphenol, cardinol, octylphenol, nonylphenol and other endcapping agents that are well-known in the art or any combination of these.

Suitable organic solvents which can be used are, for example, chlorinated aliphatic hydrocarbons, such as methylene chloride, chloroform, carbon tetrachloride, dichloroethane, trichloroethane, tetrachloroethane, dichloropropane and 1,2-dichloroethylene; substituted aromatic hydrocarbons such as, chlorobenzene, o-dichlorobenzene, and the various chlorotoluenes. The chlorinated aliphatic hydrocarbons, especially methylene chloride, are preferred.

Aqueous alkali, or alkaline earth metal hydroxide addition can be used to maintain the pH of the phosgenation mixture near the pH set point. Some non-limiting examples of the alkali metal or alkaline earth metal hydroxides, which can be employed are sodium hydroxide, potassium hydroxide, and calcium hydroxide. Sodium and potassium hydroxides, and particularly sodium hydroxide are preferred. The pH can be regulated by recirculating the reaction mixture past a pH electrode which regulates the rate of addition of the aqueous alkali metal or alkaline earth metal hydroxide.

Some non-limiting examples of the methods which can be used to eliminate any excess chloroformate groups from the reaction mixture after the addition of the hydroxyaryl-terminated polydiorganosiloxane and increase in pH are adding a calculated amount of a tertiary amine, such as triethylamine, or addition of a measured amount of a bisphenol.

Some non-limiting examples of the preferred phase transfer catalysts which can be utilized in the practice of the present invention are:

where $R^3$ is a member selected from the same or different, $C_{(1-10)}$ alkyl groups, Q is nitrogen or phosphorus, and X is a halogen or an —$OR^4$ group, where $R^4$ is hydrogen, a $C_{(1-8)}$ alkyl group or a $C_{(6-18)}$ aryl group. Some non-limiting examples of the phase transfer catalysts (PTC) which can be used in the practice of the invention are,

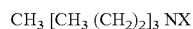

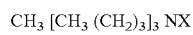

where X is selected from Cl⁻, Br⁻ or —$OR^4$, where $R^4$ is hydrogen, a $C_{(1-8)}$ alkyl group or a $C_{(6-18)}$ aryl group. An effective amount of a PTC is 0.1% to 4 mol %, and preferably 0.25% to 2 mol % relative to the aromatic dihydroxy compound in the phosgenation mixture.

A preferred PTC is methyltributylammonium chloride salt (MTBA).

Some non-limiting examples of the aromatic dihydroxy compounds include menthane bisphenols (BHPM), such as 4,4'-[1-methyl-4-(1-methyl-ethyl)-1,3-cyclohexandiyl]-bisphenol (1,3-bis-hydroxyphenyl menthane, referred to as 1,3-BHPM) and 2,8-di-(4-hydroxyphenyl)menthane (referred to as 2,8-BHPM); bis(hydroxyaryl)alkanes, such as bis(4-hydroxyphenyl)methane; 1,1-bis(4-hydroxyphenyl) ethane; 2,2-bis(4-hydroxyphenyl)propane (also known as Bisphenol A); 2,2-bis(4-hydroxyphenyl)butane; 2,2-bis(4-hydroxypllenyl)octane; bis(4-hydroxyphenyl)phenyl-methane; 2,2-bis(4-hydroxy-1-methylphenyl)propane; 1,1-bis(4-hydroxy-t-butylphenyl)propane; and 2,2-bis(4-hydroxy-3-bromophenyl)propane, bis(hydroxyaryl) cycloalkanes, such as 1,1-(4-hydroxyphenyl)cyclopentane, 1,1-bis-(4-hydroxyphenyl)-3,3,5-trimethylcyclohexane (referred to as BPI) and 1,1-bis(4-hydroxyphenyl)cyclohexane, dihydroxyaryl ethers, such as 4,4'-dihydroxydiphenyl ether and 4,4'dihydroxy-3,3'-dimethylphenyl ether, dihydroxydiaryl sulfides, such as 4,4'-dihydroxydiphenyl sulfide and 4,4'-dihydroxy-3,3'-dimethyldiphenyl sulfide, dihydroxydiaryl sulfoxides, such as 4,4'-dihydroxydiphenyl sulfoxide and 4,4'-dihydroxy-3,3'-dimethyldiphenyl sulfoxide, dihydroxydiaryl sulfones, such as 4,4'-dihydroxydiphenyl sulfone and 4,4'-dihydroxy-3,3'-dimethyldiphenyl sulfone, SBI (6,6'-dihyroxy-3,3,3',3'-tetramethyl spiro(bis)indane) ("spirobiindane bisphenol"), CD-1 (3-(4-hydroxyphenyl)-1-1,3-trimethyl-indan-5-01), florenone bisphenol, TMBPA, and cyclododecaneone bisphenol. In an exemplary embodiment of the invention, the aromatic dihydroxy compound used is Bisphenol A (BPA). In another exemplary embodiment of the invention, the aromatic dihydroxy compound used is a menthane bisphenol. In another exemplary embodiment of the invention, the aromatic dihydroxy compound used is 2,8-BHPM. In another exemplary embodiment of the invention, the aromatic dihydroxy compound used is 1,3-BHPM. The aromatic dihydroxy compound may also be a menthane bisphenol.

Menthane bisphenols have the general formula phenol-(methyl,isopropyl-cyclohexane)-phenol Many examples of menthane bisphenols are set forth in U.S. Pat. No. 5,480,959.

The aromatic dihydroxy compound may also be in a high heat monomer such as for example, phenol phthalein, 2 methyl-3,3-bis(p-hydroxyphenyl)phthalimide; 2-butyl-3,3-bis(p-hydroxyphenyl)phthalimide, 2-octyl-3,3-bis (p-hydroxyphenyl)phthalimide; 2-phenyl-3,3-bis(p-hydroxyphenyl)phthalimide and the like as disclosed in U.S. Pat. No. 5,455,310.

The polycarbonate-polysiloxane copolymer can be made in a wide variety of either semi-batch or continuous flow reactors. Such reactors are, for example, stirred tank reactors, which may be either semi-batch or continuous flow. Additional reactors which are included are agitated column and recirculating loop continuous reactors.

The volume ratio of aqueous to organic phase during and at the termination of the phosgenation reaction can be in the range of about 0.2-1:1. Reaction temperatures can be in the range of between about 15-50° C. When methylene chloride is used, the reaction may be conducted at reflux which can be 35-42° C. The reaction can be conducted at atmospheric pressures, although sub- or super-atmospheric pressures may be employed if desired.

During phosgenation, the mixture is preferably agitated, such as, by using a stirrer or other conventional equipment. The phosgenation rate can be varied depending on other reaction conditions.

In order to avoid premature precipitation of alkali metal salt, such as sodium chloride in particular instances, there can be added sufficient aqueous solvent, such as de-ionized water, to preclude a build-up in salt concentration exceeding 25% by weight of the aqueous phase.

Recovery of the polycarbonate-polysiloxane copolymer can be achieved by conventional means, such by the use of an anti-solvent, or steam precipitation or gel-crush methods. Preferably, the resin is centrifuged to remove the brine phase, followed by acid washes and water washes and a final water strip. Even more preferably, the resin is centrifuged to remove the brine phase, followed by two acid washes, 4 water washes and a final water strip. Preferably, the chloride-free resin is then steam-precipitated and dried.

As used in hereafter with respect to the invention, Mw stands for weight-averaged molecular weight determined using polycarbonate or polystyrene standards (unless otherwise noted). Mn refers to number-averaged molecular weight, MWD refers to molecular weight distribution, and disp. refers to polydispersity. The yellowness index was determined in accordance with ASTM D 1925.

Blends may be prepared according to mixing techniques well known in the art. In general, the different components of the blend are dry mixed mechanically (blenders/high speed mixers), fed to an extruder where the different resins are melted, and the different phases of the blend will get dispersed.

Among the polycarbonates which can be blended with the polycarbonate-polysiloxane copolymer are those formed by phosgenating bisphenol as previously described and preferably bisphenol A (BPA). Additional procedures which can be used to make polycarbonates useful in blending with polycarbonate-polysiloxane copolymer include polycarbonate made by ester interchange under melt polymerization conditions. By way of non-limiting example, the polycarbonate-polysiloxane copolymer can be blended with other polymers such as polycarbonates, BHPM homopolymer, copolycarbonates, copolyestercarbonates and polyesters which are illustrated by but not limited to the following: bisphenol A polycarbonate, BCC polycarbonate, BPZ (1,1,-bis(4hydroxyphenyl)cyclohexane ("cycoloyhexanone bisphenol"))polycarbonate, copolycarbonates of BPA and BPI, BPA-dodecanedioic acid copolyestercarbonate, polyethylene terephthalate, SBI (6,6'-dihydroxy-3,3,3'3'-tetramethylsprio (bis)indane ("spirobiindane bisphenol")), CD-1 (3-(4-hydroxyphenyl)-1,1,3-trimethyl-indan-5-01)), TMBPA (2,2-bis(3,5-dimethyl-4-hydroproxyphenyl)propane ("tetramethyl BPA")), 1,3-BHPM, and 2,8-BHPM. It is also possible to blend the polycarbonate with other polymers.

Applications of the Invention:

The polycarbonate-polysiloxane copolymers or blends of the polycarbonate-polysiloxane copolymer obtained by the methods as described above can be used to form shaped articles and optical articles. They can be used in blow molding processes like extrusion blow molding or injection stretch blow molding for the production of hollow products like bottles. Also, they can be used in extrusion processes for the production of profiles, solid sheets, multi-wall sheets and corrugated sheets. Polycarbonate-polysiloxane copolymers according to the invention are particularly suitable to commercial applications for plastics that require good impact resistance, particularly at lower temperature and good flame resistant performance without making use of halogenated compounds. This material is also highly desirable in commercial applications that rely on good weatherability properties and chemical resistance. Polycarbonate-polysiloxane copolymers are also particularly suitable for applications where a higher flow resin is required, meaning that the molten resin is less viscous. High flow resins are important for injection molding plastic parts that require filling of a thin mold, or for applications where cycle time is particularly important. Given the enhanced strength properties of polycarbonate-polysiloxane copolymers in comparison with polycarbonate copolymers, a lower molecular weight (and hence higher flow) resin can be used in the same application while still maintaining the same strength as BPA polycarbonate homopolymer.

Blow molded and extruded articles can be prepared using various weight percentages of the polycarbonate-polysiloxane copolymer or the blends of the polycarbonate-polysiloxane copolymer. For example, a blow molded or extruded article comprising about 0.1 to 99.9% by weight of the polycarbonate-polysiloxane copolymer or the blends of the polycarbonate-polysiloxane copolymer may be prepared; a blow molded or extruded article comprising about 10 to 75% by weight of the polycarbonate-polysiloxane copolymer or the blends of the polycarbonate-polysiloxane copolymer may also be prepared; and a blow molded or extruded article comprising about 20 to 60% by weight of the polycarbonate-polysiloxane copolymer or the blends of the polycarbonate-polysiloxane copolymer may be prepared. It will be appreciated that other ranges for the weight percentage of the polycarbonate-polysiloxane copolymer or the blends of the polycarbonate-polysiloxane copolymer may also be used to prepare blow molded or extruded articles.

The desired optical article may be obtained by molding the substantially single phase copolycarbonate or alternatively molding a blend of the substantially single phase copolycarbonate with a polycarbonate, a copolycarbonate, a copolyestercarbonate or a polyester by injection molding, compression molding, extrusion methods and solution casting methods. Injection molding is the more preferred method of forming the article.

Optional Components in the Final Resin:

It will be appreciated that the invention is usable with many variations known in the art. In the present invention, the final resin may further contain any, none, or all of the following: heat stabilizers, light stabilizers, ultraviolet absorbents, mold releasing agents, fire retardants, colorants, pigments, dyes, anti-static agents, lubricants, anti-fogging agents, natural oils, synthetic oils, waxes, organic fillers and inorganic fillers, which are generally described in the prior art.

One embodiment of the invention is a polycarbonate-polysiloxane copolymer resin prepared using BPA and from about 1 to about 10%, hydroxyaryl-terminated polydiorganosiloxane, using the eugenol-capped polydiorganiosiloxane having the following structure:

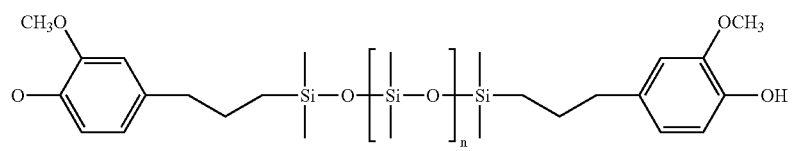

where the resin has a Mw of from about 18,000 to 28,000. The terminology "D-50" n in the tables means that n is an average of 48, or the total diorganosiloxane content is on average about 50. The n number can be determined by NMR methods. In another embodiment, the transparent resin will be 5% siloxane and have a Mw of about 21,000 to 25,000.

In the first part of this disclosure, a reaction process is described which produces a polycarbonate-polysiloxane copolymer which is an improvement over previously-produced polycarbonate-polysiloxane copolymers in that it is transparent. In order for this transparency to have practical utility, it is important that the transparency be retained during melt processing.

While this polycarbonate-polysiloxane does retain its transparency during standard melt processing, it has been observed that under abusive conditions (temperatures and residence times that exceed the usual, recommended conditions, but which are nevertheless sometimes utilized by molders) the parts produced exhibit haze (poor transparency).

In this part of the disclosure, we will describe a class of additive stabilizers which suppress this haze formation, a method for suppressing haze formation by addition of acid stabilizers. Examples of useful acid additive stabilizer compounds, which could suppress haze formation in transparent polycarbonate-polysiloxane, include but are not limited to: phosphoric acid, phosphorous acid, hypophosphorous, pyrophosphoric acid, polyphosphoric acid, boric acid, hydrochloric acid, hydrobromic acid, sulfuric acid, sulfurous acid, benzenesulfinic acid, toluenesulfinic acid, benzenesulfonic acid, p-toluenesulfonic acid, trifluoromethane sulfonic acid, naphthalene sulfonic acid, sulfonated polystyrene and copolymers.

These acids can be used singly or in combination. Furthermore, partially neutralized acid salts of the multi-functional acids described above are also useful in this invention. Additives which produce acids on exposure to heat or moisture or combinations thereof are also considered possible for use in the present invention to suppress haze formation.

Of these acid compounds applicants found that the use of phosphorous acid and phosphoric acid to be preferred. These two acids suppress formation without significantly effecting PC-Siloxane physical properties or PC-Siloxane molecular weight. These stabilizers can be added to a PC-siloxane, and a transparent PC-siloxane product and items made therefrom. While it is known to include H3PO4 and HP3PO3 in polycarbonate resin, Applicants have not found its use mentioned in transparent polycarbonate-siloxane copolymers to prevent haze formation under abusive molding conditions (i.e., molding at a higher temperature and longer time than is necessary).

U.S. Pat. No. 5,608,027, discloses the combination of either H3PO3 or H3PO4+ phosphite esters in a wide range of PC resin compositions (blends and copolymers) as a color stabilizer, there is reference to PC siloxane (even specifically resins with eugenol siloxane blocks) in the description of the invention, and example #76 is a blend of such a PC siloxane with PC homopolymer and the stabilizer combination, but the PC-siloxane composition is an opaque resin and the benefit reported is improved color. U.S. Pat. No. 5,608,027 cites a large number of earlier patents that primarily relate to stabilization of polycarbonate resin with similar stabilizers.

Applicants have found that addition of acids at very low ppm levels (typically less than 50 ppm is sufficient and usually 10 ppm and more preferably 2.5 ppm or less) to the PC siloxane copolymer stabilizers against haze increase under abusive molding conditions. The acids are typically added to the powder resin prior to extrusion pelletization. The pellets are molded into test parts and the % haze on the test parts measured.

The invention will now be further described by way of the following, non limiting examples.

EXAMPLES

In the Examples below, the MW of BCF oligomers was determined by the following procedure:
1. To a 100 ml bottle add 25 ml of methylene chloride, 5 ml of 2N HCl and 10 to 15 mls of reactor sol'n taken after the chloroformate formation step is complete.
2. Shake the bottle for 30 seconds, check the pH and insure that it is less than 2; if not add additional acid and recheck until pH <2.
3. Allow the sample to decant, then transfer ~2 mls of the lower methylene phase to a new bottle. To the new bottle add 50 mls of methylene chloride containing toluene as an internal standard. (1 ml of toluene to 4000 mls of methylene chloride).
4. Shake the bottle for 15 seconds, filter with a 0.25micron Teflon filter and place in a Waters GPC vial for analysis.
5. Determine MW of the oligomer using a Waters GPC containing a Styragel HR 3 and a Syragel HR 4 column at a flow rate or 1 ml/min.
6. MW determined Vs. Polycarbonate standards.

BPA Eugenosiloxane Copolycarbonates

Example 1

BPA/D-50 Eugenolsiloxane Copolycarbonate
(BCF-PTC Method—Using Pre-formed BCF)

A 30 L phosgenator was charged with 0.33 M BPA-bischlorformate (about n=6) solution (2 L, 660 mmol), methylene chloride (5 L), distilled water (7 L) and MTBA (20 g of a 75 wt % solution in water) and D-50 eugenolsiloxane (90 g, 22 mmol). The pH was adjusted to 10.5 with 50 wt % NaOH, and the reaction mixture was stirred for 10 minutes. BPA (1254 g, 5500 mmol) was added, and the reaction mixture was stirred until the chloroformates were gone. Then p-cumylphenol (85 g, 401 mmol, 5.5 mol %) and triethylamine (15 mL, 1.5 mol %)) were added. Phosgene (681 g, 6879 mmol) was added at pH 10.5. Methylene chloride (4 L) was added. The polymer solution was separated from the brine and washed two times with 1N HCl and three times with distilled water. The polymer solution was anti-solvent (methanol) precipitated in a Henchel blender, and dried overnight at 110° C. under vacuum. The polymer, analyzed by $^1$H NMR, showed complete incorporation of the eugenolsiloxane. A 15 wt % solution of the polymer in methylene chloride was transparent as was a compression molded film of the polymer. The Tg was 148° C. and the Mw was 35,800 (polystyrene standards).

Example 2

BPA/D-50 Eugenolsiloxane Copolycarbonate (5% D-50 Copolymer)

A 150 L stirred-reactor was charged with 15 L of methylene chloride, 15 L of de-ionized (DI) water, 1585 g (6.94 mol) of BPA, and 100 ml of MTBA. The mixture was phosgenated at a rate of between 40 and 140 g/min until 1050 g of phosgene was delivered. (The delivered amount was determined by a totalizer connected to a mass flowmeter). The phosgenation target rate was 140 g/min; however, it was necessary to deviate from this rate due to heavy foaming in the reactor. The pH was held between 6 and 7 by the continuous addition of sodium hydroxide (50 wt %). Once the addition of phosgene was complete, the reactor was sparged with nitrogen to remove excess phosgene. A reactor sample was then taken, tested for phosgene using phosgene paper, and analyzed for chloroformate. The chloroformate concentration was found to be 0.24 moles/liter. A charge of eugenol capped siloxane 450 g (0.11 mol) dissolved in 1 liter of methylene chloride was then added to the reactor over a period of approximately 1 minute. The siloxane addition tube was then rinsed with an additional 1 liter of methylene chloride to insure that all of the siloxane monomer had been transferred to the reactor. The pH was then raised to between 10.5-11.5 and the siloxane allowed to react with the bischloroformate BPA oligomers for a period of 10 minutes. At this point a second reaction sample was taken and checked for the presence of chloroformates. The reactor was then charged with 6350 g (27mol) of BPA, 20 L of methylene chloride and 20 L DI water. The reaction mixture was then allowed to stir until all of the residual chloroformates had disappeared. Then 283 grams (1.33 mol) of para-cumylphenol (PCP) and 75 ml of triethylamine (TEA) were charged to the reactor. The reaction mixture was then phosgenated (3225 g) to completion at a pH between 10.5 and 11.5. Once the desired amount of phosgene was added, a reaction sample was taken and analyzed for chloroformates and phenolic groups. The reaction mixture was then transferred to the centrifuge feed tank and purified in a series of 7 centrifugations to separate the resin from the brine. The resin was then washed by two HCl acid washes and 4 DI water washes, followed by a water stripping step to remove previous wash water. The purified resin solution was then steam-precipitated and dried. The dried powder was analyzed for TEA (0.35 ppm), ionic chloride (0 ppm), and Molecular weight (Mw 25599, Mn 10052, and MWD 2.54). The powder was then hot-pressed and found to form a transparent film. A 15 wt % solution of the dried powder was also found to be transparent.

Example 3

BPA/D-50 Eugenolsiloxane Copolycarbonate (7% D-50 Copolymer)

A 150 L stirred-reactor was charged with 15 L of methylene chloride, 15 L of DI water, 5000 g (21.9 mol) of BPA, and 100 ml of MTBA. The mixture was phosgenated at a rate between 40 and 140 g/min until 3360 g of phosgene was delivered. (The delivered amount was determined by a totalizer connected to a mass flowmeter). The phosgenation target rate was 140 g/min; however, it was necessary to deviate from this rate due to heavy foaming in the reactor. The pH was held between 6 and 7 by the continuous addition of sodium hydroxide (50 wt %). Once the addition of phosgene was complete the reactor was sparged with nitrogen to remove excess phosgene. A reactor sample was then taken, tested for phosgene using phosgene paper, and analyzed for chloroformate. The chloroformate concentration was found to be 0.39 moles/liter. A charge of eugenol capped siloxane 906 g (0.23 mol) dissolved in 1 liter of methylene chloride was then added to the reactor over a period of approximately 1 minute. The siloxane addition tube was then rinsed with an additional 1 liter of methylene chloride to insure that all of siloxane monomer had been transferred to the reactor. The pH was then raised to between 10.5-1.5 and the siloxane allowed to react with the bischloroformate BPA oligomers for a period of 10 minutes. At this point a second reaction sample was taken and checked for the presence of chloroformates. The reactor was then charged with 5000 g (21.9 mol) of BPA, 20 L of methylene chloride and 20 L DI water. The reaction mixture was then allowed to stir until all of the residual chloroformates had disappeared. Then 265 g (1.25 mol) of para-cumylphenol (PCP) and 95 ml of triethylamine (TEA) were charged to the reactor. The reaction mixture was then phosgenated (2660 g) to completion at a pH between 10.5 and 11.5. Once the desired amount of phosgene was added, a reaction sample was taken and analyzed for chloroformates and phenolic groups. The reaction mixture was then transferred to the centrifuge feed tank and purified in a series of 7 centrifugations to separate the resin from the brine. The resin was then washed by two HCl acid washes and 4 DI water washes, followed by a water stripping step to remove previous wash water. The purified resin solution was then steam-precipitated and dried. The dried powder was analyzed for TEA (0 ppm), ionic chloride (0 ppm), and molecular weight (Mw 30,832, Mn 12,077, and MWD 2.55). The powder was then hot-pressed to form a transparent film. A 15 wt % solution of the dried powder was also found to be transparent.

Example 4

BPA/D-50 Eugenolsiloxane Copolycarbonate (10% D-50 Copolymer)

A 150 L stirred reactor was charged with 15 L of metlhylene chloride, 15 L of DI water, 5000 g (21.9 mol) of BPA, and 100 ml of MTBA. Tile mixture was phosgenated at a rate between 40 and 140 g/min until 3360 g of phosgene was delivered. (The delivered amount was determined by a totalizer connected to a mass flowmeter). The phosgenation target rate was 140 g/min; however, it was necessary to deviate from this rate due to heavy foaming in the reactor. The pH was held between 6 and 7 by the continuous addition of sodium hydroxide (50 wt % ). Once the addition of phosgene was complete, the reactor was sparged with nitrogen to remove excess phosgene. A reactor sample was then taken, tested for phosgene using phosgene paper, and analyzed for chloroformate. The chloroformate concentration was found to be 0.18 moles/liter. A charge of eugenol capped siloxane 1240 g (0.31 mol) dissolved in 1 liter of methylene chloride was then added to the reactor over a period of approximately 1 minute. The siloxane addition tube was then rinsed with an additional 1 liter of methylene chloride to insure that all of siloxane monomer had been transferred to the reactor. The pH was then raised to between 10.5-11.5 and the siloxane allowed to react with the bischloroformate BPA oligomers for a period of 10 minutes. At this point a second reaction sample was then taken and checked for the presence of chloroformates. The reactor was then charged with 5000 g (21.9 mol) of BPA, 20 L of methylene chloride and 20 L DI water. The reaction mixture was then allowed to stir until all of the residual chloroformates had disappeared. Then 265 grams (1.25 mol) of p-cumylphenol (PCP) and 95 ml of triethylamine (TEA) were charged to the reactor. The reaction mixture was then phosgenated (2660 g) to completion at a pH between 10.5 and 11.5. Once the desired amount of phosgene was added, a reaction sample was taken and analyzed for chloroformates and phenolic groups. The reaction mixture was then transferred to the centrifuge feed tank and purified in a series of 7 centrifugations to separate the resin from the brine. The resin was then washed by two HCl acid washes and 4 DI water washes, followed by a water stripping step to remove previous wash water. The purified resin solution was then steam-precipitated and dried. The dried powder was analyzed for TEA (0.26 ppm), ionic chloride (0.62 ppm), and Molecular weight (Mw 31,430, Mn 12,154, and MWD 2.59). The powder was then hot-pressed to form a transparent film. A 15 wt % solution of the dried powder was also found to be transparent.

Example 5

BPA/D-50 Eugenolsiloxane Copolycarbonate (15% D-50 Copolymer)

A 150 L stirred reactor was charged with 15 L of methylene chloride, 15 L of DI water, 5000 g (21.9 mol) of BPA, and 100 ml of MTBA. The mixture was phosgenated at a rate between 40 and 140 g/min until 3360 g of phosgene was delivered. (The delivered amount was determined by a totalizer connected to a mass flowmeter). The phosgenation target rate was 140 g/min; however, it was necessary to deviate from this rate due to heavy reactor foaming. The pH was held between 6 and 7 by the continuous addition of sodium hydroxide (50 wt % ). Once the addition of phosgene was complete, the reactor was sparged with nitrogen to remove excess phosgene. A reactor sample was then taken, tested for phosgene using phosgene paper, and analyzed for chloroformate. The chloroformate concentration was found to be 0.27 moles/liter. A charge of eugenol capped siloxane 1965 g (0.49 mol) dissolved in 1 liter of methylene chloride was then added to the reactor over a period of approximately 1 minute. The siloxane addition tube was then rinsed with an additional 1 liter of methylene chloride to insure that all of siloxane monomer had been transferred to the reactor. The pH was then raised to between 10.5-11.5 and the siloxane allowed to react with the bischloroformate BPA oligomers for a period of 10 minutes. At this point a second reaction sample was then taken and checked for the presence of chloroformates. The reactor was then charged with 5000 g (21.9 mol) of BPA, 20 L of methylene chloride and 20 L DI water. The reaction mixture was then allowed to stir until all of the residual chloroformates had disappeared. Then 265 grams (1.25 mol) of para-cumylphenol (PCP) and 95 ml of triethylamine (TEA) were charged to the reactor. The reaction mixture was then phosgenated (2660 g) to completion at a pH between 10.5 and 11.5. Once the desired amount of phosgene was added, a reaction sample was taken and analyzed for chloroformates and phenolic groups. The reaction mixture was then transferred to the centrifuge feed tank and purified in a series of 7 centrifugations to separate the resin from the brine. The resin was then washed by two HCl acid washes and 4 DI water washes, followed by a water stripping step to remove previous wash water. The purified resin solution was then steam-precipitated and dried. The dried powder was analyzed for TEA (0.0 ppm), ionic chloride (0.0 ppm), and Molecular weight (Mw 34,194, Mn 13,509, and MWD 2.53). The powder was then hot-pressed and found to form a transparent film. A 15 wt % solution of the dried powder was also found to be transparent.

Three samples of D-50 eugenolsiloxane copolycarbonate were prepared by a procedure similar to that described in Example 2. The procedure was varied to produce high (NW=25,504), medium (MW-21,374) or low (MW=17,854) molecular weight resin. The samples were then blended with a standard additives by extrusion methods. Also, the medium molecular weight resin was blended with a BPA homopolymer made by the interfacial polycarbonate process using a paracumyl phenol endcap 50 phr of homopolymer: 50 phr of BPA polysiloxane-eugenolsiloxane). The following additives were blended into each of the above resins:
- 0.3 phr TINUVIN 234 (2-benzotriazol-2-yl-4,6-bis-(1-methyl-1-phenyl-ethyl)-phenol);
- 0.3 phr PETS mold release (pentaerythritol tetrastearate);
- 0.3 KSS (potassium diphenylsulfone sulfonate);
- 0.09 IRGAPHOS 168=tris-(2,4-di-t-butylphenyl)phosphate.

Table 1 below shows the transmission and haze results for the above formulations.

TABLE 1

Comparison of Polycarbonate-Polysiloxane Copolymer Resins and Blends

| measurement | units | 5% D-50 High Mw | 5% D-50 Med Mw | 5% D-50 Low Mw | 5% D-50 PC blend | Prior Art* 5% D-50/ PC blend |
|---|---|---|---|---|---|---|
| Mn | — | 9793 | 8463 | 6598 | 10,405 | — |
| Mw | — | 25504 | 21374 | 17854 | 25,298 | — |
| Disp. (Mw/Mn) | — | 2.60 | 2.53 | 2.71 | 2.43 | 10,405 |
| Tg | °C. | 148.4 | 144.2 | 140.6 | | — |
| Yellowness Index | — | 8.7 | 8.1 | 7.6 | | — |
| Transmission | % | 86.9 | 87.1 | 87.5 | — | 75.0 |
| Haze | % | 4.2 | 6.5 | 10.4 | 1.6 | 27.8 |

*Blend of silicone-polycarbonate and polycarbonate prepared according to the methods disclosed in U.S. Pat. No. 5,530,083.

High Heat Polycarbonate—Polysiloxane Blends

Example 6

BPI/BPA/D-50 Eugenolsiloxane Terpolycarbonate (BCF-PTC Method)

A 500 ME Morton flask was charged with BPA (1.43 g, 6.3 mmol), bisphenol I (BPI) (2.36 g, 7.6 mmol), methylene chloride (70 ME), distilled water (70 ME) and MTBA (0.2 g of a 75 wt % solution in water). The pH was adjusted to 7 with 25 wt % NaOH. Phosgene (2.13 g, 21 mmol, 50 mol % excess) was added to 0.5 g/min maintaining the pH at 7 by the addition of the NaOH solution. The pH was raised to 11.5 and D-50 eugenolsiloxane (0.9 g, 0.22 mmol) was added and the reaction was stirred for 20 minutes at which time BPA (5.75 g, 25.2 mmol) and BPI (9.54 g, 30.8 mmol) were added. After the chloroformates were gone, p-cumylphenol (0.85 g, 4.0 mmol, 5.5 mol %), and triethylamine (150 uL, 1.5 mol %) were added along with additional phosgene (6.82 g, 68 mmol) while maintaining the pH at 10.5. Methylene chloride (50 ME) was added. The polymer solution was separated from the brine and washed one time with 1N HCl and two times with distilled water. The polymer solution was precipitated into boiling water (750 ME) in a blender, washed with water (500 ME) and dried overnight at 110° C. under vacuum. The polymer, analyzed by 1-H NMR, showed complete incorporation of the eugenolsiloxane. A 15 wt % solution of the polymer in methylene chloride was transparent as was a compression molded film. The Tg was 188° C. and the Mw was 36,700 (polystyrene standards).

Example 7

BPA/BHPM Copolycarbonate (01-MX-208)

A 150 L stirred-reactor was charged with 56 L of methylene chloride, 38 L of DI water, 12000 g of BHPM, and 77 ml of TEA. Then 314 g of p-cumylphenol was added as the chainstopper. The mixture was phosgenated at pH 10-11 at rate of 130 g/min until 5226 grams of phosgene was delivered. (The delivered amount was determined by a totalizer connected to a mass flowmeter.) Once the desired amount of phosgene was added, a reaction sample was taken and analyzed for phenolic groups. After determining the batch was finished, the reaction mixture was transferred to the centrifuge feed tank and purified on a series of 7 centrifuges. The centrifuges were configured to split the resin from the brine followed by two HCl acid washes and 4 DI water washes, followed by a water stripping step to remove previous wash water. The purified resin solution was then steam precipitated and dried. The powder was then hot pressed and found to form a transparent film. A 15 wt % solution of the dried powder was also found to be transparent.

Example 8

BPA/BHPM D-50 Eugenolsiloxane Copolycarbonate (5% D-50 copolymer 01-MX-210)

A 150 L stirred-reactor was charged with 15 L of methylene chloride, 15 L of DI water, 2500 g of BHPM, and 75 ME of MTBA. The mixture was phosgenated at a rate between 40 and 140 g/min until 1200 grams of phosgene was delivered. (The delivered amount was determined by a totalizer connected to a mass flowmeter.) The phosgenation target rate was 140 g/min; however, it was necessary to deviate from this rate due to heavy reactor foaming. The pH was held between 6 and 7 by the continuous addition of sodium hydroxide (50 wt %). Once the addition of phosgene was complete, the reactor was sparged with nitrogen to remove excess phosgene. A reactor sample was then taken, tested for phosgene using phosgene paper, and analyzed for chloroformate. A charge of eugenol-capped siloxane 271 g (0.067 mol) dissolved in 1 liter of methylene chloride was then added to the reactor over a period of approximately 1 minute. The siloxane monomer had been transferred to the reactor. The siloxane addition tube was then rinsed with an additional 1 liter of methylene chloride to insure that all the siloxane monomer had been transferred to the reactor. The pH was then raised to between 10.5-11.5 and the siloxane allowed to react with the bischloroformate BPA oligomers for a period of 20 minutes. At this point a second reaction sample was taken and checked for the presence of chloroformates. The reaction was then charged with 2500 g BHPM, 20 L of methylene chloride and 20 L DI water. The reaction mixture was then allowed to stir until all the residual chloroformates had disappeared. Then 78.5 grams (0.38 mol) of p-cumylphenol and 32 mL of triethylamine (TEA) were charged to the reactor. The reaction mixture was then phosgenated (1200 g) to completion at a pH between 10.5 and 11.5. Once the desired amount of phosgene was added, a reaction sample was taken and analyzed for phenolic groups. After determining the batch was finished, the reaction mixture was transferred to the centrifuge feed tank and purified on a series of 7 centrifuges. The centrifuges were configured to split the resin from the brine followed by two HCl acid washes and 4 DI water washes, followed by a water stripping step to remove previous wash water. The purified resin solution was then steam precipitated and dried. The powder was then hot pressed and found to form a transparent film. A 15 wt % solution of the dried powder was also found to be transparent.

Transparent Polycarbonate-polysiloxane Copolymer Stabilized with H3PO3 or H3PO4 to Prevent Loss of Transparency on Abusive Molding The following data describes results of testing the addition of phosphate stabilizers to eugenosiloxane copolycarbonates. The stabilizers were added to powdered resin prior to extrusion pelletization, and test parts were subsequently molded by conventional injection molding methods.

In FIG. 1 the table shows the problem to be solved is demonstrated. Five different typical lots of PC siloxane copolymer were molded at a relatively high molding temperature of 620° F. Under as standard molding cycle, in which the molding machine is operated continuously with a part ejected every approximately 36 seconds, the haze levels are normal for this material. In contrast when the molding cycle in interrupted and the resin held in the barrel of the molding machine for either 5 or 10 minutes, (5 or 10 min dwell) the haze level in the parts initially ejected after the dwell are unacceptably high.

From FIG. 1 it can be seen that while all lots of resin exhibit haze on abusive molding, there is considerable variability from one lot to another, evidently due to variability in the reaction process and/or impurity levels. There is also some variability in the haze formation for an individual lot, as seen for the two haze measurement from two different moldings of lot D. This is likely due to the normal variability in temperature in an injection molding machine.

In FIG. 2 data is presented on the effect of several different phosphorus-based acid stabilizers added to the PC-siloxane resin prior to extrusion pelletization. The phosphorus based stabilizers were tested at equivalent molar levels. The data shows dramatic improvements in haze with addition of very low ppm levels of the acids, to the extent that each acid was shown to suppress haze formation completely when tested at its optimal level.

The remainder of the data in FIG. 2 was generated for the purpose of attempting to identify any adverse effects of the acid additives by subjecting the samples to other types of abusive test conditions. The rheology data, either the comparison of Melt Volume Rate with 18 vs. 6 min residence time at 300° C. in the melt index tester or the 300° C., 30 min rheology profiles showed no evidence of resin degradation or instability due to the presence of the acid If fact some of the data indicates better stability for samples containing the acids. The autoclave data (125 degrees C test condition) also shows no adverse effects in most instances from the presence of the acids, either in regard to haze formation or molecular weight loss compared to the Comparative Example 1.

In FIG. 3 data is presented on the effect of one of the acids tested in FIG. 2, H3PO3 or phosphorus acid, in a different lot of the PC siloxane resin, lot E of FIG. 1. Lot E was one of the better lots tested in regard to minimal haze formation on abusive molding. The testing in FIG. 3 shows that the benefit of haze reduction is replicated in this testing of this batch and that for this batch also there is no significant detrimental effect seen in the other types of abusive testing, autoclaving and the 18 vs. 6 min dwell Melt Volume Rate testing.

In FIG. 4 data is presented that shows that the benefit of the acid stabilization is in fact generally effective, in that five different randomly selected lots of PC siloxane all exhibited the improvement in haze on abusive molding with addition of the acid. The acid stabilizer additives of the present invention to suppress haze formation were also tested with PC-Siloxane resins which did not show haze stability issues. No detrimental changes to melt stability, haze or molecular weight were detected. This data is also shown in Table 3 and further support the observation that the acid stabilizer additives are not detrimental to PC-Siloxane performance.

What is claimed is:

1. A method for preparing an aromatic bischloroformate mixture, the method comprising the step of: combining one or more aromatic dihydroxy compounds with phosgene, a phase transfer catalyst, an aqueous solvent and an organic solvent under interfacial reaction conditions while maintaining the pH in the range of about 3 to about 8, wherein the phase transfer catalyst is present in an amount that is effective for catalyzing a reaction between the phosgene and the one or more aromatic dihydroxy compounds, and carrying out the reaction until about 105 to about 150 mole percent of phosgene has been added based on the total moles of available hydroxy groups of the one or more aromatic dihydroxy compounds, thus producing an aromatic bischloroformate mixture.

2. The method of claim 1, wherein the pH is maintained in the range of from about 6 to about 7.

3. The method of claim 1, further comprising the step of sparging the aromatic bischloroformate mixture with a sufficient amount of nitrogen to remove any excess phosgene.

4. The method of claim 1, wherein the chain length of the aromatic bischloroformate is equal to or greater than 6.

5. A method for making a polycarbonate-polysiloxane copolymer, wherein the polycarbonate-polysiloxane copolymer comprises from about 0.5% to about 80% by weight of a hydroxyaryl-terminated polydiorganosiloxane, and wherein the hydroxyaryl-terminated polydiorganosiloxane has from about 10 to about 100 diorganosiloxy units, the method comprising the steps of:

(A) preparing a bischloroformate reaction mixture by combining a first portion of one or more aromatic dihydroxy compounds with phosgene, a phase transfer catalyst, an aqueous solvent and an organic solvent under interfacial reaction conditions while maintaining the pH in the range of from about 3 to about 8;

(B) adding a portion or all of the hydroxyaryl-terminated polydiorganosiloxane to the resulting mixture of (A), wherein the total hydroxyaryl-terminated polydiorganosiloxane is a sufficient amount to satisfy the desired polydiorganosiloxane weight percent requirements in the finally resulting polycarbonate-polysiloxane copolymer;

(C) adjusting the pH of the mixture forward in step (B) to a value in the range of about 10 to about 14 either before, or during after step (B);

(D) subsequently adding one or more of the remaining portions of the total amount of the one or more aromatic dihydroxy compounds, an aqueous solvent and an organic solvent;

(E) optionally repeating the addition of hydroxyaryl-terminated polydiorganosiloxane and/or aromatic dihydroxy compound until the total amount of the one or more aromatic dihydroxy compounds has been added and all of the hydroxyaryl-terminated polydiorganosiloxane has been added;

(F) allowing reaction to occur until 50 ppm or less of residual chloroformates remain;

(G) subsequently adding an agent selected from the group consisting of a chainstopper, a co-phosgenation catalyst and combination thereof, to the resulting mixture of (F); and (H) adding a sufficient amount of phosgene to the resulting mixture of (G), while maintaining a pH of about 9 to about 12, to complete a reaction to form the polycarbonate-polysiloxane copolymer.

6. The method of claim 5, wherein the concentration of bischloroformate in step (A) is from about 0.05 to 0.3 M.

7. The method of claim 5, further comprising the steps of sparging the resulting mixtures of steps (A) and (H) with a sufficient amount of nitrogen to remove any excess phosgene.

8. The method of claim 7, further comprising the step of purifying and isolating the resulting polycarbonate-polysiloxane copolymer of step (H).

9. The method of claim 5, further comprising the step of adding a chainstopper to the mixture of step (A).

10. The method of claim 5, wherein the polycarbonate-polysiloxane copolymer has from about 0.5% to about 15% by weight of a hydroxyaryl-terminated polydiorganosiloxane.

11. The method of claim 5, wherein the pH of the mixture of step (A) is maintained in the range of from about 6 to about 7.

12. The method of claim 5, wherein the first portion of a total amount of the one or more aromatic dihydroxy compounds added in step (A) is about 10% to about 99%.

13. The method of claim 5, wherein the first portion of a total amount of the one or more aromatic dihydroxy compounds added in step (A) is about 20% to about 50%.

14. The method of claim 5, wherein the pH of the mixture of step (C) is adjusted to a value in the range of about 10.5 to about 11.5.

15. The method of claim 5, wherein the pH range of step (C) is maintained for a period of about 5 to 30 minutes.

16. The method of claim 5, wherein in step (F), the reaction is allowed to occur for sufficient time such that less than 1 ppm of residual chloroformates remain.

17. The method of claim 5, wherein in step (F) the reaction is not allowed to occur for a time sufficient such that hydrolysis begins to OCCUR such that the molecular weight of the polycarbonate-polysiloxane copolymer is reduced.

18. The method of claim 5, wherein the pH of the mixture of step (H) is adjusted to a value in the range of about 10.5 to about 11.5.

19. The method of claim 5, wherein the polycarbonate-polysiloxane copolymer has a haze value below about 10%.

20. The method of claim 5, wherein the phase transfer catalyst is a chemical represented by the following formula:

$$(R^3)_4 Q^+ X^-$$

where $R^3$ is a member selected from the same or different, $C_{(1-10)}$ alkyl groups, Q is nitrogen or phosphorus, and X is a halogen or an —$OR^4$ group, where $R^4$ is hydrogen, a $C_{(1-8)}$ alkyl group or a $C_{(6-18)}$ aryl group.

21. The method of claim 20, wherein the phase transfer catalyst is methyltributylammonium chloride salt.

22. The method of claim 5, wherein the amount of phase transfer catalyst added is 0.1% to 4 mol % relative to the one or more aromatic dihydroxy compounds added in step (A).

23. The method of claim 5, wherein the amount of phase transfer catalyst added is 0.25% to 2 mol % relative to the one or more aromatic dihydroxy compounds added in step (A).

24. The method of claim 5, wherein one of the one or more aromatic dihydroxy compounds is bisphenol A.

25. The method of claim 5, wherein one of the one or more aromatic dihydroxy compounds is 1,3-BHPM, 2,8-BHPM, or a combination of 1,3BHPM and 2,8-BHPM.

26. The method of claim 5, wherein the one or more aromatic dihydroxy compounds is a combination of bisphenol A and BPI.

27. The method of claim 5, wherein the organic solvent is a chlorinated aliphatic hydrocarbon.

28. The method of claim 27, wherein the chlorinated aliphatic hydrocarbon is methylene chloride.

29. The method of claim 5, wherein the hydroxyaryl-terminated polydiorganosiloxane comprises from about 20 to about 60 diorganosiloxy units.

30. The method of claim 5, wherein hydroxyaryl-terminated polydiorganosiloxane is a phenol-siloxane included within the formula:

$$R\!\!-\!\!\underset{}{\bigodot}\!\!-\!\!R^1\!\!-\!\!\left[\underset{R^2}{\overset{R^2}{\underset{|}{\overset{|}{Si}}O}}\right]_n\!\!-\!\!\underset{R^2}{\overset{R^2}{\underset{|}{\overset{|}{Si}}}}\!\!-\!\!R^1\!\!-\!\!\underset{}{\bigodot}\!\!-\!\!R$$

where each R may be the same or different and is selected from the group of radicals consisting of hydrogen, halogen, $C_{(1-8)}$ alkoxy, $C_{(1-8)}$ alkyl and $C_{(6-13)}$ aryl, $R^1$ is a $C_{(2-8)}$ divalent aliphatic radical, $R^2$ is selected from the same or different $C_{(1-13)}$ monovalent organic radicals, and n is an integer equal to 1 to 1000 inclusive.

31. The method of claim 5, wherein the hydroxyaryl-terminated polydiorganosiloxane is a 2-allylphenol-terminated polydimethylsiloxane.

32. The method of claim 5, wherein the hydroxyaryl-terminated polydiorganosiloxane is a (2-methoxy-4-allylphenol)-terminated polydimethylsiloxane.

33. The method of claim 32, wherein the block length of the (2-methoxy-4-allylphenol)-terminated polydimethylsiloxane has an average of 40 to 60 dimethylsiloxy units.

34. The method of claim 5, wherein the chainstopper is a monohydroxy aromatic compound.

35. The method of claim 34, wherein the monohydroxy aromatic compound is phenol, p-butylphenol, p-cumylphenol, octylphenol, nonylphenol, or a combination of these.

36. The method of claim 5, wherein the co-phosgenation catalyst is a tertiary amine or a bisphenol.

37. The method of claim 36, wherein the tertiary amine is triethylamine.

38. The method of claim 5, wherein the polycarbonate-polysiloxane copolymer has a Mw of from about 13,000 to about 50,000 based on polycarbonate standards.

39. The method of claim 5, wherein the chain length of the aromatic bischloroformate of step (A) is equal to or greater than 6.

40. The method of claim 6, further comprising the additional step of combining a polymer with the polycarbonate-polysiloxane copolymer, thus producing a blend.

41. The method of claim 8, further comprising the additional step of combining a polymer with the polycarbonate-polysiloxane copolymer, thus producing a blend.

42. The method of claim 8, further comprising the additional step of combining polycarbonate with the polycarbonate-polysiloxane copolymer, thus producing a blend.

43. A polycarbonate-polysiloxane copolymer prepared according to the method of claim 8.

44. The polycarbonate-polysiloxane copolymer of claim 43, wherein the polycarbonate-polysiloxane copolymer has a maximum haze value of 10%.

45. The polycarbonate-polysiloxane copolymer of claim 43, wherein the polycarbonate-polysiloxane copolymer has a Mw of about 13,000 to 50,000.

46. The polycarbonate-polysiloxane copolymer of claim 43, wherein the polycarbonate-polysiloxane copolymer has a Tg of about 140° C. or more.

47. The polycarbonate-polysiloxane copolymer of claim 43, wherein the polycarbonate-polysiloxane copolymer has from about 1% to about 15% by weight of a hydroxyaryl-terminated polydiorganosiloxane.

48. The polycarbonate-polysiloxane copolymer of claim 43, wherein the hydroxyaryl-terminated polydiorganosiloxane comprises from about 20 to about 60 diorganosiloxy units.

49. The polycarbonate-polysiloxane copolymer of claim 43, wherein the polycarbonate-polysiloxane copolymer was prepared using bisphenol A and from about 1 to about 10% (2-methoxy-4-allylphenol)-capped polydiorganosiloxane having the following structure: 4 and wherein the polycarbonate-polysiloxane copolymer has a Mw of from about 18,000 to about 28,000.

50. The polycarbonate-polysiloxane copolymer of claim 43, wherein the polycarbonate-polysiloxane copolymer comprises about 5% by weight of a hydroxyaryl-terminated polydiorganosiloxane and has a Mw of about 21,000 to about 25,000.

51. The polycarbonate-polysiloxane copolymer of claim 43, wherein the polycarbonate-polysiloxane copolymer further comprises a sufficient amount of acid stabilizer to at least partly stabilize the haze of the polycarbonate-polysiloxane copolymer when it is dwell molded at 620° F. for 10 minutes.

52. The polycarbonate-polysiloxane copolymer of claim 51, wherein the polycarbonate-polysiloxane copolymer further comprises less than 50 ppm phosphorous acid.

53. A polycarbonate-polysiloxane copolymer prepared according to the method of claim 39.

54. A blend produced according to the method of claim 40.

55. The blend of claim 54, wherein the blend has a haze value of less than about 10%.

56. The blend of claim 54, wherein the blend comprises polycarbonate-polysiloxane copolymer present in an amount sufficient to provide by weight, from about 0.5% to about 80% of polydiorganosiloxane.

57. The blend of claim 54, wherein the blend comprises polycarbonate-polysiloxane copolymer present in an amount sufficient to provide by weight, from about 0.5% to about 20% of polydiorganosiloxane.

58. A blend produced according to the method of claim 42.

59. The blend of claim 58, wherein the blend has a haze value of less than about 10%.

60. The blend of claim 58, wherein the blend comprises polycarbonate-polysiloxane copolymer present in an amount sufficient to provide by weight, from about 0.5% to about 80% of polydiorganosiloxane.

61. The blend of claim 58, wherein the blend comprises polycarbonate-polysiloxane copolymer present in an amount sufficient to provide by weight, from about 0.5% to about 20% of polydiorganosiloxane.

62. The blend of claim 58, wherein the blend comprises by weight about 70% polycarbonate-polysiloxane copolymer and about 30% polycarbonate.

63. The blend of claim 62, wherein the blend further comprises a phosphite stabilizer and one or more colorants.

64. A polycarbonate-polysiloxane copolymer comprising: bisphenol A subunits; and polydiorganosiloxane subunits, wherein less than 0.5 mol % of the polydiorganosiloxane subunits are directly coupled to another polydiorganosiloxane subunit.

65. The polycarbonate-polysiloxane copolymer of claim 64, wherein the bisphenol A subunits have a chain length of 6 or greater.

66. The polycarbonate-polysiloxane copolymer of claim 64, wherein the polycarbonate-polysiloxane copolymer has a haze value of 10% or less.

67. The polycarbonate-polysiloxane copolymer of claim 66, wherein the copolymer has a haze value of 10% or less, and wherein the copolymer when blended with a polycarbonate produces a blend that has a haze value that is less than the haze value of the copolymer.

68. The polycarbonate-polysiloxane copolymer of claim 66, wherein the polycarbonate-polysiloxane copolymer was prepared using bisphenol A and from about 1 to about 10% of a (2-methoxy-4-allylphenol)-capped polydiorganosiloxane having the following structure: 5 and wherein the polycarbonate-polysiloxane copolymer has a Mw of from about 18,000 to about 28,000.

69. The polycarbonate-polysiloxane copolymer of claim 66, wherein the polycarbonate-polysiloxane copolymer comprises about 5% by weight of a hydroxyaryl-terminated polydiorganosiloxane and has a Mw of about 21,000 to about 25,000.

70. The polycarbonate-polysiloxane copolymer of claim 66, wherein the polycarbonate-polysiloxane copolymer further comprises a phosphite stabilizer and one or more colorants.

71. The polycarbonate-polysiloxane copolymer of claim 66, wherein the polycarbonate-polysiloxane copolymer is prepared according to the method of claim 8.

72. The polycarbonate-polysiloxane copolymer of claim 66, wherein the polycarbonate-polysiloxane copolymer is prepared according to the method of claim 8.

73. A blend produced by combining the polycarbonate-polysiloxane copolymer of claim 65 with a polymer.

74. A blend produced by combining the polycarbonate-polysiloxane copolymer of claim 66 with a polymer.

75. A blend produced by combining the polycarbonate-polysiloxane copolymer of claim 66 with polycarbonate.

76. A blend produced by combining the polycarbonate-polysiloxane copolymer of claim 64 with polycarbonate.

77. The blend of claim 75, wherein the polycarbonate-polysiloxane copolymer was prepared using bisphenol A and from about 1 to about 10% of a (2-methoxy-4-allylphenol)-capped polydiorganosiloxane having the following structure: 6 and wherein the polycarbonate-polysiloxane copolymer has a Mw of from about 18,000 to about 28,000.

78. The blend of claim 75, wherein the polycarbonate-polysiloxane copolymer comprises about 5% by weight of a hydroxyaryl-terminated polydiorganosiloxane and has a Mw of about 21,000 to about 25,000.

79. The blend of claim 75, wherein the blend comprises by weight 70% of polycarbonate-polysiloxane copolymer and 30% of polycarbonate.

80. The blend of claim 79, further comprising a phosphite stabilizer and one or more colorants.

81. The polycarbonate-polysiloxane copolymer of claim 80, wherein the polycarbonate-polysiloxane copolymer further comprises less than 50 ppm phosphorous acid, to at least partly stabilize the haze of the blend when it is dwell molded at 620° F. for 10 minutes.

82. A shaped article formed from the polycarbonate-polysiloxane copolymer of claim 39.

83. A shaped article formed from the blend of claim 49.

84. A shaped article formed from the polycarbonate-polysiloxane copolymer of claim 43.

85. A shaped article formed from the blend of claim 54.

86. A shaped article formed from the polycarbonate-polysiloxane copolymer of claim 66.

87. A shaped article formed from the blend of claim 74.

88. A method for making polycarbonate-polysiloxane copolymer, which method comprises: a) reacting a mixture comprising an aromatic dihydroxy compound, water, an organic solvent and phosgene in the presence of a phase transfer catalyst and the absence of a co-phosgenation catalyst while adding sufficient quantities of base to maintain the pH between 3 and 8 to form bischloroformate oligomer mixture; b) adding to the bischloroformate oligomer mixture a hydroxyaryl-terminated polydiorganosiloxane and adjusting the pH (before or after said addition) by base addition to a range of from 10 to 14; c) adding a second quantity of a dihydroxy compound; d) allowing the polymerization reaction to proceed for a time sufficient to reduce the chloroformate level to less than 50 ppm but for a time insufficient to cause substantial hydrolysis of the polymer; e) adding a chainstopper and a tertiary amine; f) adding phosgene to complete the reaction and adjusting the pH to 9-11.

89. A method for making a polycarbonate-polysiloxane copolymer, which method comprises preparing bischloroformates by reaction together an aromatic dihydroxyl compound, water, an organic solvent and phosgene at a pH of from 3 to 8 in the presence of a phase transfer catalyst and the absence of a co-phosgenation catalyst, to form a chloroformate and subsequently reacting said chloroformate with a hydroxyaryl-terminated polydiorganosiloxane.

90. The method of claim 89, wherein the molar ratio of chloroformate endgroups to phenolic and endgroups on the hydroxyaryl terminated polydiorganosiloxane is greater than 4.

91. The method of claim 90, wherein the molar ratio is greater than 10.

92. The method of claim 91, wherein the molar ratio is greater than 30.

93. A polycarbonate-polysiloxane copolymer comprising monomer units derived from hydroxyaryl-terminated polydiorganosiloxane has from about 10 to about 60 diorganosiloxy units, the average chain length of the aromatic bischloroformate is 6 or greater, and haze value is less than 10.

94. The polycarbonate-polysiloxane copolymer of claim 93, wherein the haze value is less than 5.

95. A blend of a polycarbonate homopolymer and the polycarbonate-polysiloxane copolymer of claim 94 wherein the haze value is less than 5.

96. The method of claim 5, wherein step (A) is carried out until about 105 to about 150 mole percent of phosgene has been added based on the total moles of available hydroxy groups of the one or more aromatic dihydroxy compounds.

97. The method of claim 88, wherein step a is carried out until about 105 to about 150 mole percent of phosgene has been added based on the total moles of available hydroxy groups of the one or more aromatic dihydroxy compounds.

98. The method of claim 89, wherein during the formation of chloroformates the reaction is carried out until about 105 to about 150 mole percent of phosgene has been added based on the total moles of available hydroxy groups of the one or more aromatic dihydroxy compounds.

* * * * *